(12) United States Patent
De Zwart et al.

(10) Patent No.: US 6,492,779 B1
(45) Date of Patent: Dec. 10, 2002

(54) DISPLAY DEVICE

(75) Inventors: Siebe Tjerk De Zwart, Eindhoven (NL); Jacob Bruinink, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 37 days.

(21) Appl. No.: 09/857,342

(22) PCT Filed: Oct. 2, 2000

(86) PCT No.: PCT/EP00/09651

§ 371 (c)(1),
(2), (4) Date: Jun. 4, 2001

(87) PCT Pub. No.: WO01/25839

PCT Pub. Date: Apr. 12, 2001

(30) Foreign Application Priority Data

Oct. 5, 1999 (EP) .............................................. 99203250

(51) Int. Cl.[7] ................................................ H01J 17/49
(52) U.S. Cl. ...................... 315/169.4; 313/582; 313/586
(58) Field of Search ........................... 315/169.3, 169.4; 313/581, 582, 584, 586

(56) References Cited

U.S. PATENT DOCUMENTS 5,898,271 A * 4/1999 Mehrotra et al. ............ 313/582

FOREIGN PATENT DOCUMENTS

WO          WO9904408          1/1999

* cited by examiner

Primary Examiner—David Vu

(57) ABSTRACT

Plasma channels in a PALC display have a minimal width, which implies that substantially all light passes via optically planar surfaces so that depolarization is prevented. The small width also enhances the extinction rate of the plasma so that less critical gas mixtures may be used. In a specific embodiment, the microsheet may be dispensed with.

7 Claims, 4 Drawing Sheets

DISPLAY DEVICE

The invention relates to a display device having a first substrate comprising channels which contain an ionizable gas, in which a wall of a channel is provided with at least one electrode for generating, in operation, a plasma discharge of the ionizable gas, a second substrate provided with column electrodes, and a layer of electro-optical material between the two substrates.

Display devices for displaying monochromatic or color images comprise, inter alia, plasma-addressed liquid crystal display devices referred to as PALC displays. The PALC displays are used as television and computer monitor displays and are preferably of the flat-panel type.

A display device of the type described in the opening paragraph is known from PCT patent application WO-A-99/04408 (PHN 16.485). The flat-panel display device described in this application comprises a display screen having a pattern of (identical) data storage or display elements and a multitude of channels. The channels are filled with an ionizable gas and provided with electrodes for (selectively) ionizing the ionizable gas in operation. In the known display device, the channels have the shape of parallel, elongate channels (formed in a channel plate), which function as selection means for the display device (the plasma-addressed row electrodes). By applying a DC voltage difference across the electrodes in one of the channels of the channel plate, electrons are emitted (from the cathode) and ionize the ionizable gas, forming a plasma (plasma discharge). When the voltage across the electrodes in the one channel is switched off, and the gas is de-ionized, a subsequent channel is switched on. The channels are sealed by a (thin) dielectric layer ("microsheet") on the display screen side of the display device. The display device further comprises a layer of an electro-optical material provided between the channel plate and a substrate provided with further electrodes which function as the data electrodes or column electrodes of the display device. The display device is formed by the assembly of the channel plate with the electrodes and the ionizable gas, the dielectric layer, the layer of the electro-optical material and the substrate with the further electrodes. The display elements are defined by the overlapping portions of the column electrodes and the channels of the channel plate.

Usually, a liquid crystal material is used as an electro-optical medium, in which the direction of polarization of incoming light changes in dependence upon the voltage across the liquid crystal layer. The light source is placed behind the channel plate. In a transmissive display, polarized light then passes the channel plate. This channel plate may be manufactured in different ways.

A first possibility is to start from an optically planar glass on which rib structures are made by means of powder blasting in a frit provided on the glass or by means of silk screen printing. Both technologies are costly, while, moreover, the upper sides of the ribs must be polished at a later stage so as to obtain a uniform thickness as well as prevent depolarization. Depolarization occurs also on the walls of the channels.

A second possibility is to provide the channels by means of powder blasting or by sawing in a glass plate. An optically planar and straight bottom is difficult to obtain with this method, so that depolarization also occurs in this case.

The rate at which the device can be driven, both as regards transmissive and as regards reflective display devices, is also dependent on the size (the width) of the channels because this influences the switch-off (extinction) of the plasma in the channels and notably defines the period of time in which plasma particles can reach the walls where they are to be de-ionized or neutralized. It is true that this period of time can be decreased by making use of, for example, a helium-hydrogen gas mixture instead of the conventional helium or helium-xenon gas mixtures, but this solution requires a hydrogen buffer.

Also the use of a microsheet presents problems because strict requirements are to be imposed on the (mechanical) flatness in this case. Moreover, the greater part of the applied voltage will be present across this microsheet so that high drive voltages, in this case column voltages, are necessary. Possible corrections of column voltages for compensating crosstalk or temperature variations will then increase accordingly, which usually leads to unacceptably high column voltages.

SUMMARY OF THE INVENTION

It is, inter alia, an object of the present invention to obviate one or more of the above-mentioned drawbacks as much as possible. To this end, a display device according to the invention is characterized in that the first substrate is provided at the area of crossings of the channels and the column electrodes with picture electrodes whose surface extends in the direction of the column electrodes through at least twice the width of a channel. The surface preferably extends in the direction of the column electrodes through at least 4 times the width of a channel.

Since the channels are now much narrower than the dimensions of the picture electrodes, the polarized light is not depolarized or hardly depolarized at the location of the picture electrodes. Locations where possible depolarization may occur, notably the (walls of the) channels may be covered with a black mask, if necessary.

Besides, the dimensions of the channels may be considerably smaller so that the plasma extinguishes at a faster rate. Instead of a helium-hydrogen gas mixture, use can now be made of helium or of the conventional helium or helium-xenon gas mixtures. This applies to both transmissive and reflective display devices.

A first embodiment of a display device according to the invention is characterized in that the picture electrodes are present on the side of a transparent dielectric layer remote from the layer of electro-optical material and extend across the channels. The picture electrodes are now realized as separate image faces on the dielectric layer ("microsheet"). This provides the possibility of compensating column crosstalk because the potential on the picture electrodes is unambiguous.

A preferred embodiment of a display device according to the invention is characterized in that, viewed in a cross-section, at least a part of the first substrate substantially completely surrounds the channels, and the picture electrodes are connected in an electrically conducting manner to at least a part of the walls of the channels via electrically conducting connections.

In this case, the dielectric layer ("microsheet") is completely superfluous so that a more robust construction is obtained which is even cheaper. The channels may be manufactured by means of powder blasting, sawing or etching in glass, which is cheaper than powder blasting in frit or silk screening. Moreover, the voltages used are much lower than in the conventional PALC display devices. Due to these lower voltages, cheaper drive electronics are possible because the column crosstalk can also be compensated in a simpler way.

A further display device according to the invention is characterized in that the first substrate comprises a first sub-substrate in which parts of the walls of the channels are present on the side remote from the layer of electro-optical material, and a second sub-substrate provided with at least one electrode for generating, in operation, a plasma discharge of the ionizable gas.

These and other aspects of the invention are apparent from and will be elucidated with reference to the embodiments described hereinafter.

BRIEF DESCRIPTION OF THE DRAWINGS

FIG. 2 is a perspective elevational view, partly broken away, of a part of a construction of a plasma-addressed liquid crystal display device (PALC), while FIG. 6 shows a variant of the display device of FIG. 5, while

The Figures are diagrammatic and not drawn to scale. For the sake of clarity, some dimensions are strongly exaggerated. Similar components in the Figure are denoted as much as possible by the same reference numerals.

DETAILED DESCRIPTION OF THE PREFERRED EMBODIMENTS

Figure 1:
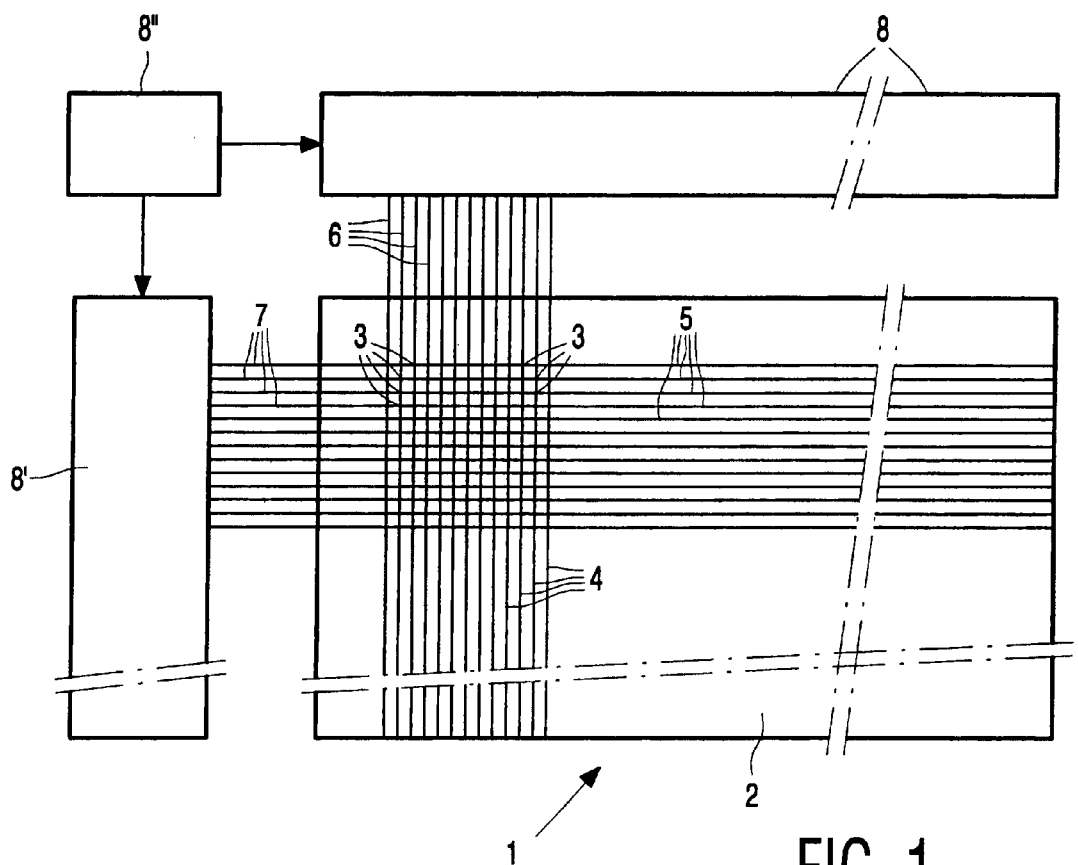
FIG. 1 is a block diagram of a display device.

FIG. 1 shows very diagrammatically a display device in a block diagram. The display device 1 comprises a pattern 2 of pixels which are mutually separated from each other in the vertical and horizontal directions (at a predetermined distance). Each pixel 3 comprises overlapping portions of (thin, narrow) electrodes 4 of a group of electrodes arranged in vertical columns and (thin, narrow) electrodes 5 of a further group of electrodes arranged in horizontal rows. The electrodes 4 of the group of electrodes are also referred to as the column electrodes and the electrodes 5 of the further group of electrodes are also referred to as the row electrodes. In a plasma-addressed liquid crystal display device (PALC), the rows are formed by long, narrow channels (the channels). The pixels 3 in each row of electrodes (channels) 5 represent one data line.

The width of the electrodes 4, 5 defines the dimensions of the pixels 3 which typically have a rectangular shape. Electrodes 4 receive (analog) data drive signals via conductors 6 from a drive circuit 8, and electrodes 5 receive (analog) data drive signals via conductors 7 from a drive circuit 8'.

To realize an image or a data graphic display on a relevant area of the surface 2, the display device uses a scan control circuit 8" which controls the drive circuits 8, 8'. Various types of electro-optical material may be used in the display device. Examples of electro-optical materials are (twisted) nematic or ferroelectric liquid crystal materials. Generally, the electro-optical materials attenuate the transmitted or reflected light in dependence upon a voltage which is applied across the material.

Figure 2:
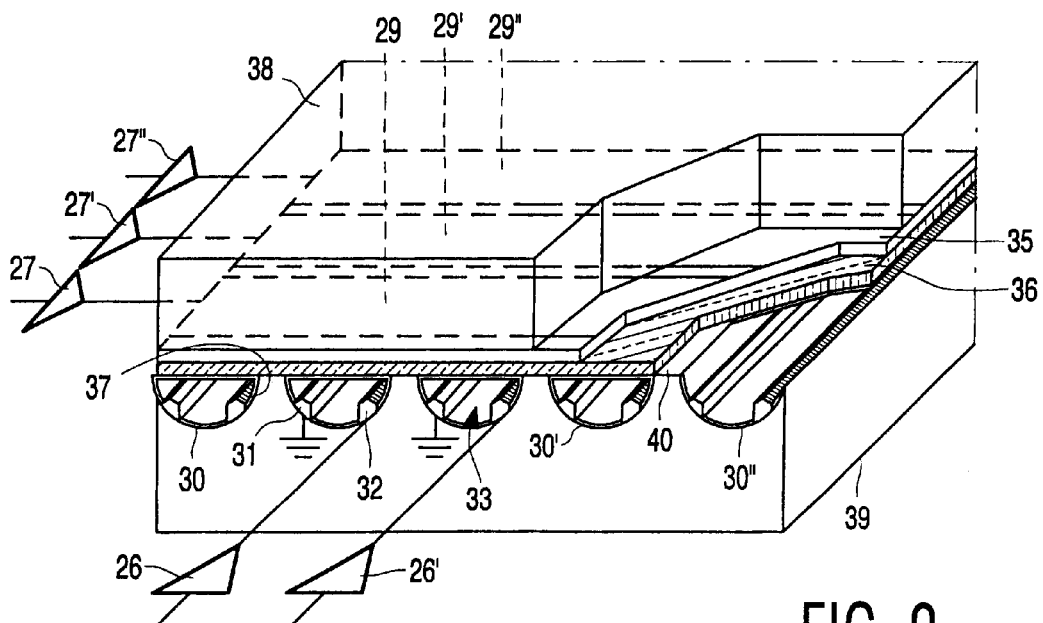
Figure 3:
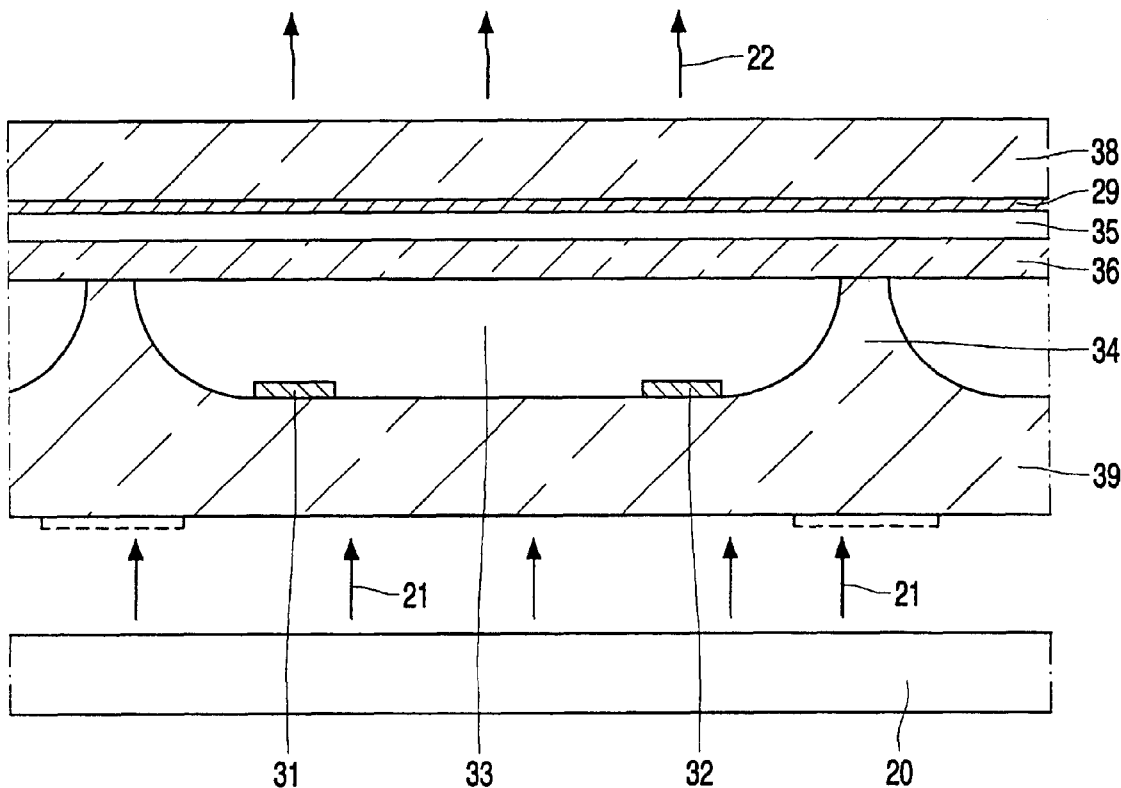
FIG. 3 is a cross-section of a part of a conventional construction of a plasma-addressed liquid crystal display device (PALC)

FIGS. 2 and 3 are a diagrammatic, perspective elevational view, partly broken away, of a part of a construction and a cross-section, respectively, of a part of a plasma-addressed liquid crystal display device (PALC) comprising a first substrate 39 and a second substrate 38. FIG. 2 shows only three column electrodes 29, 29', 29". The row electrodes 30, 30', 30" functioning as selection means are formed by a plurality of parallel, elongate channels under an electro-optical layer 35 of an electro-optical material. The panel has electric connections to the column electrodes 29, 29', 29" and to the plasma electrodes 31, 32, the column electrodes 29, 29', 29" receiving (analog) drive signals from output amplifiers 27, 27', 27", and the anode electrodes 32 in the (plasma) channels 30, 30', 30" receiving drive signals from output amplifiers 26, 26'. Each (plasma) channel 30, 30', 30" is filled with an ionizable gas 33 and is sealed with a thin dielectric layer ("microsheet") 36 consisting of, for example, glass. Each channel is provided on an inner surface (wall) with first and second elongate electrodes 31, 32 extending throughout the length of the channel. The second electrode 32 is referred to as the anode and is fed with a pulsed voltage, referred to as "strobe pulse", at which electrons emitted from the cathode 31 ionize the gas, thus forming a plasma. In an alternative embodiment, the cathode is fed with a negative (DC) pulse. The next channel is not switched on until after the strobe pulse has ended and the gas is de-ionized.

In this embodiment, the display device is formed as a transmissive display device and, to this end, it has a light source or backlight 20 whose emitted light (denoted by arrows 21) is modulated and passed (denoted by arrows 22), dependent on the voltage across the pixels. Polarized light is usually used in liquid crystal display devices. The backlight 20 may emit polarized light, but the device may be provided with a polarizer (not shown) on the side of the backlight 20 so as not to disturb the direction of polarization of the incoming light 21. As described in the opening paragraph, this imposes strict requirements on the technology to be used for manufacturing the channels 33 (expensive methods such as powder blasting in a provided frit, silk screening, polishing the upper sides of the ribs at a later stage).

Figure 4:
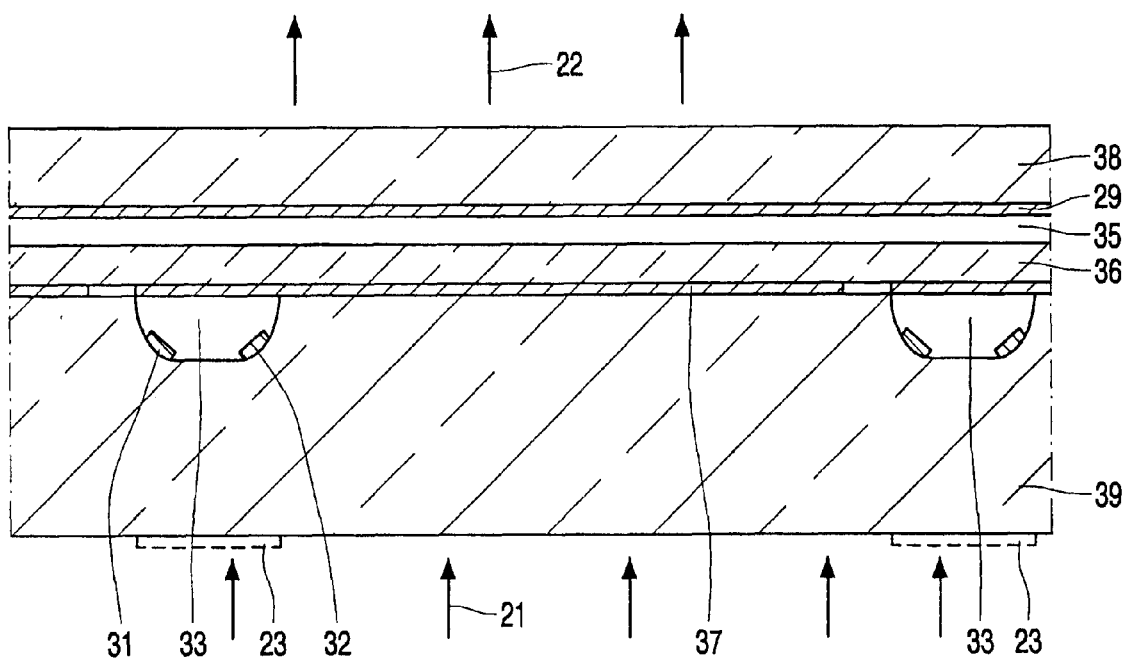
FIG. 4 is a cross-section of a part of a construction of such a display device according to the invention.

FIG. 4 is a cross-section of a first embodiment of a part of a display device according to the invention. The (plasma) channels 33 are filled with an ionizable gas and sealed by a thin dielectric layer ("microsheet") 36 consisting of, for example, glass. Each channel is provided on an inner surface (wall) with first and second elongate electrodes 31, 32 extending throughout the length of the channel. In the known embodiment of FIG. 3, the dimension (width) of a pixel is defined by the width of a channel 33. To obtain an aperture which is as large as possible, the barrier ribs 34 are realized with a minimal width. In the device of FIG. 4, however, the channels 33 are realized with a minimal width (20 to 50 % of the pixel width). This width is so small that the polarized light 21 mainly passes along the channels and is thus not subjected to a depolarizing effect. During selection, separate picture electrodes 37 provided on the microsheet 36 are fed with the desired voltage (dependent on the voltage across the column electrodes) via the plasma discharge in the channels 33. To prevent passage of light at the area of the channels 33, which light could be depolarized in the channels, the display device may be provided with a black mask 23 (shown diagrammatically). In this way, the channels are entirely kept outside the light paths. Therefore, less stringent requirements than in the known device are imposed on the channels. The channels may be made by means of powder blasting, sawing or etching. Only optically planar glass surfaces are present in the light paths. Moreover, they are not disturbed by, for example, plasma-induced blackening phenomena.

Due to the small dimensions of the channels 33, there is also a fast extinction so that a He/H$_2$ mixture is avoided (including the accompanying hydrogen buffers). Moreover, less stringent requirements are imposed on the shape of the channels which can be made in a simple way by means of powder blasting, sawing or etching in glass.

Since the picture electrodes 37 of, for example, ITO (indium tin oxide) are provided on the microsheet 36 in a structured manner, column crosstalk may be compensated more easily. The structuring is less attractive, also in view of the small thickness of the microsheet 36; however, the picture electrodes 37 may also be provided on the substrate 39.

Figure 5:
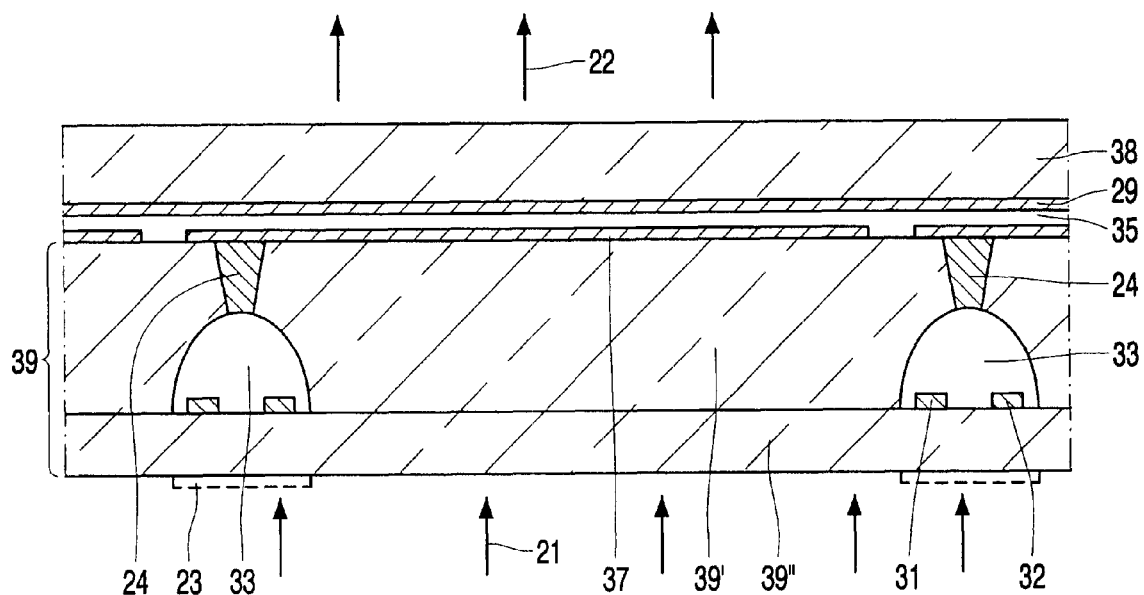
FIG. 5 is a cross-section of a part of a construction of another display device according to the invention.

FIG. 5 is a cross-section of a second embodiment of a part of a display device according to the invention, in which the channels 33 are substantially completely surrounded by the substrate 39. To this end, the substrate 39 is divided into two sub-substrates 39', 39".

The elongate electrodes 31, 32 (cathode, anode) are on the lower sub-substrate 39" opposite channels 33 provided in the upper (thin) sub-substrate 39'. The channels may be made again by means of powder blasting, sawing or etching. For the purpose of an electrically conducting contact with the picture electrodes 37, the sub-substrate 39' comprises conducting through-connections or vias 24 obtained, for example, in that an aperture obtained by means of powder blasting is filled up with a conducting frit. The other reference numerals denote the same components as in FIG. 4.

The extra advantage of the embodiment of FIG. 5 is that the microsheet is entirely absent, which is favorable from a manufacturing-technical point of view. Moreover, the absence of the microsheet implies that it is possible to work at much lower drive voltages. Consequently, the column crosstalk is less and can be compensated in an easier way.

Figure 6:
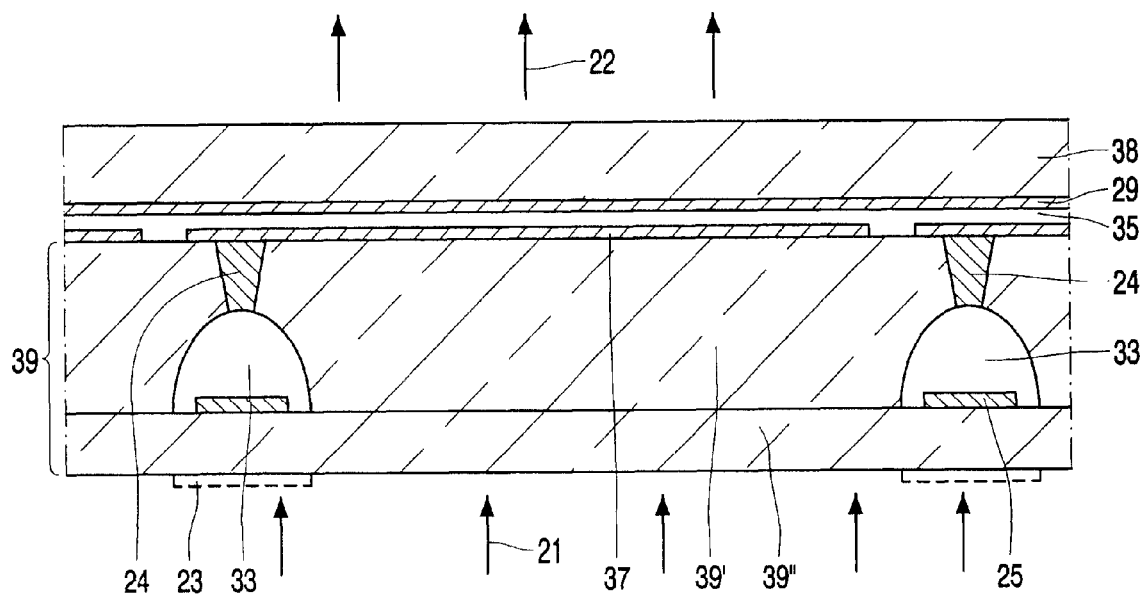

A variant of the embodiment of FIG. 5 is shown in FIG. 6. The elongate electrodes 31, 32 are now replaced by a single elongate electrode 25 per channel. The gas discharge in the channels 33 is now generated via a sufficiently high voltage between the column electrodes 29 and the electrodes 25. The other reference numerals again denote the same components as those in FIGS. 4 and 5. A similar construction (channels with one elongate electrode 25 per channel) is applicable in the device of FIG. 4.

Figure 7:
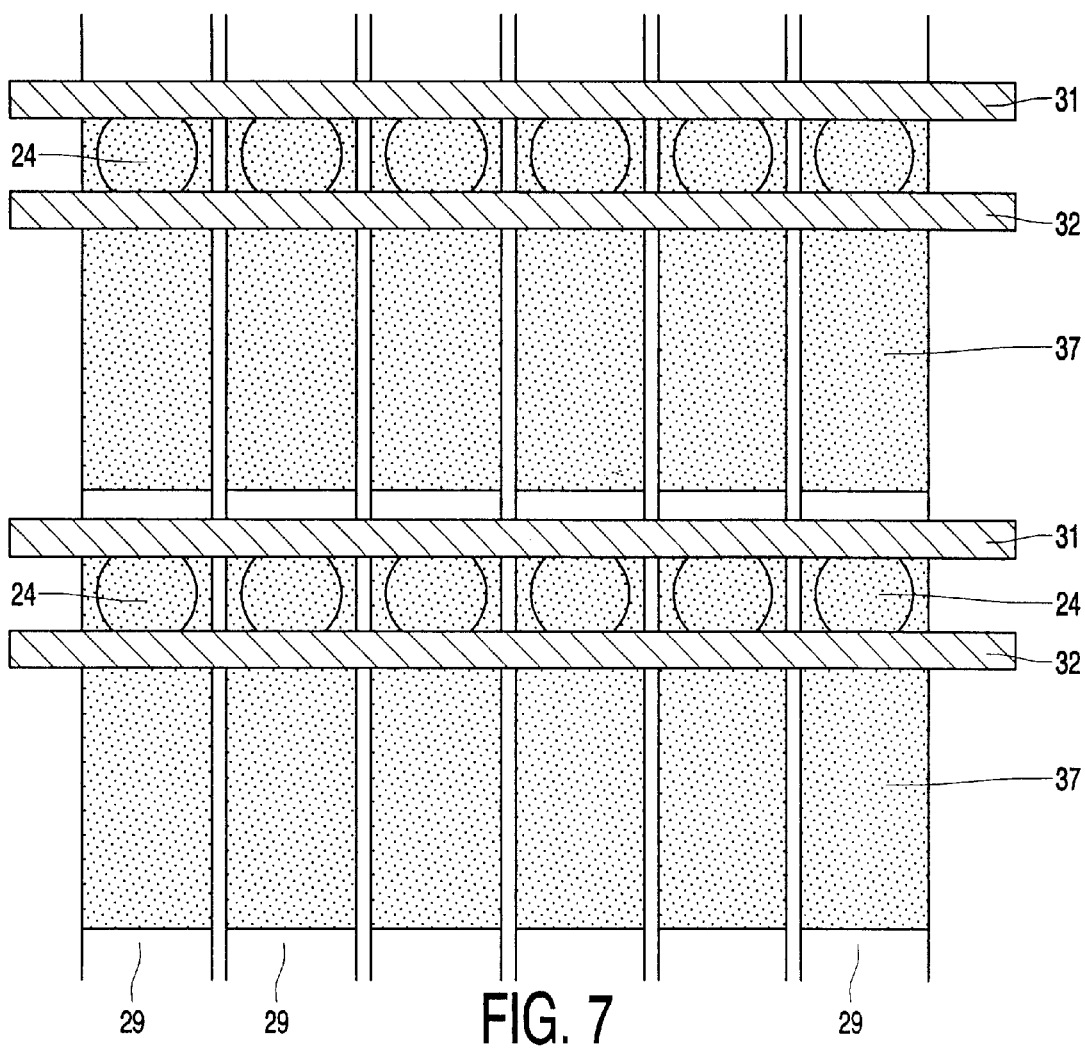
FIG. 7 is a diagrammatic plan view of the devices of FIGS. 4 to 6.

FIG. 7 is a diagrammatic plan view of the mutual positioning of the channels 33, the electrodes 31, 32, 37 and 29 and the vias 24 in the display devices shown in FIGS. 3 and 4.

Figure 8:
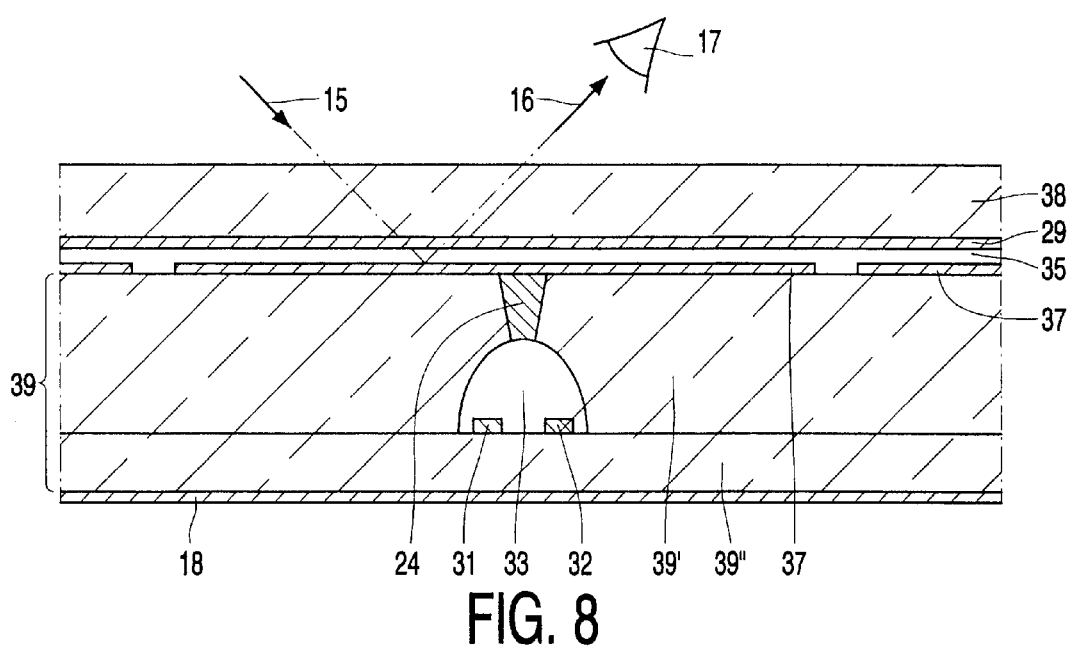
FIG. 8 shows a variant of the display device of FIG. 5 for a reflective display device.

FIG. 8 shows a reflective display device. The channels 33 and vias 24 are now present under the picture electrodes 37.

Incoming light 15 is now reflected via these electrodes formed from a reflective material, for example, aluminum; the reflected light 16 reaches the viewer 17. Although there is no risk of depolarization due to irregularities (optically non-planar glass) in the substrate 39 in these types of devices, there are all the other advantages (fast extinction of the plasma, absence of the microsheet) as mentioned above. To prevent effects of ambient light, the device is provided with a layer of light-absorbing material 18 on its entire rear side. If necessary, the substrate 39 may also consist of light-absorbing material.

The invention resides in each and every novel characteristic feature and each and every combination of characteristic features.

What is claimed is:

1. A display device having a first substrate comprising channels which contain an ionizable gas, in which a wall of a channel is provided with at least one electrode for generating, in operation, a plasma discharge of the ionizable gas, a second substrate provided with column electrodes, and a layer of electro-optical material between the two substrates, characterized in that the first substrate is provided at the area of crossings of the channels and the column electrodes with picture electrodes whose surface extends in the direction of the column electrodes through at least twice the width of a channel.

2. A display device as claimed in claim 1, characterized in that the surface of the picture electrodes extends in the direction of the column electrodes through at least 4 times the width of a channel.

3. A display device as claimed in claim 1 or 2, characterized in that the picture electrodes are present on the side of a transparent dielectric layer remote from the layer of electro-optical material and extend through the channels.

4. A display device as claimed in claim 1 or 2, characterized in that, viewed in a cross-section, at least a part of the first substrate substantially completely surrounds the channels, and the picture electrodes are connected in an electrically conducting manner to at least a part of the walls of the channels via electrically conducting connections.

5. A display device as claimed in claim 4, characterized in that the first substrate comprises a first sub-substrate in which parts of the walls of the channels are present on the side remote from the layer of electro-optical material, and a second sub-substrate provided with at least one electrode for generating, in operation, a plasma discharge of the ionizable gas.

6. A display device as claimed in claim 1 or 2, characterized in that the display device comprises a black mask which, viewed at least perpendicularly to the surface of the channel plate, extends at least at the area of the channels.

7. A display device as claimed in claim 1 or 2, characterized in that the channels extend at the area of edges of the picture electrodes.

\* \* \* \* \*